United States Patent
Almy et al.

(10) Patent No.: US 10,340,840 B2
(45) Date of Patent: *Jul. 2, 2019

(54) OSCILLATION BRAKE FOR SOLAR TRACKING SYSTEM

(71) Applicant: SolarCity Corporation, San Mateo, CA (US)

(72) Inventors: Charles Almy, Berkeley, CA (US); Soren Jensen, Corte Madera, CA (US)

(73) Assignee: SolarCity Corporation, San Mateo, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/981,746

(22) Filed: Dec. 28, 2015

(65) Prior Publication Data

US 2017/0187327 A1    Jun. 29, 2017

(51) Int. Cl.
*H02S 20/32* (2014.01)

(52) U.S. Cl.
CPC .................... *H02S 20/32* (2014.12)

(58) Field of Classification Search
None
See application file for complete search history.

(56) References Cited

U.S. PATENT DOCUMENTS

| | | | |
|---|---|---|---|
| 4,103,151 A | 7/1978 | Chromie | |
| 4,328,789 A | 5/1982 | Nelson | |
| 4,445,030 A | 4/1984 | Carlton | |
| 6,042,060 A | 3/2000 | Sargis | |
| 6,058,930 A | 5/2000 | Shingleton | |
| 6,123,067 A | 9/2000 | Warrick | |
| 7,503,431 B2 | 3/2009 | Sperber et al. | |
| 8,119,963 B2 | 2/2012 | Scanlon | |
| 8,178,775 B2 | 5/2012 | Taylor, II et al. | |
| 8,273,978 B2 | 9/2012 | Thompson et al. | |
| 8,389,918 B2 | 3/2013 | Oosting et al. | |

(Continued)

FOREIGN PATENT DOCUMENTS

EP    2000750 A2    12/2008
EP    2489961 A1    8/2012

(Continued)

OTHER PUBLICATIONS

Zhang et al., Dynamic analysis of deployable solar panel, Yuhang Xuebao/Journal of Astronautics, Jul. 2009, pp. 1359-1364, vol. 30, Issue 4, China Spaceflight Society, Beijing, China.

(Continued)

*Primary Examiner* — Shannon M Gardner
(74) *Attorney, Agent, or Firm* — Kilpatrick Townsend & Stockton LLP (57) ABSTRACT

A solar-tracking photovoltaic array is described. The photovoltaic array includes mounting hardware configured to rotate photovoltaic modules associated with the photovoltaic array about one or more axes. In some embodiments, the photovoltaic modules can be coupled to a torque tube oriented in a substantially North-South direction. An orientation motor can then rotate one end of the torque tube in a manner that causes the photovoltaic modules to track the sun. The photovoltaic array can also include a locking mechanism that secures another end of the torque tube during times in which the orientation motor is not rotating the torque tube.

9 Claims, 11 Drawing Sheets

(56) References Cited

U.S. PATENT DOCUMENTS

| | | |
|---|---|---|
| 8,459,249 B2 | 6/2013 | Corio |
| 8,587,775 B1 | 11/2013 | Wilson et al. |
| 8,671,931 B2 | 3/2014 | Curtis et al. |
| 8,692,173 B2 | 4/2014 | Altaii et al. |
| 8,973,570 B2 | 3/2015 | Stavrou et al. |
| 2010/0263659 A9 | 10/2010 | Taylor et al. |
| 2011/0041834 A1* | 2/2011 | Liao ............... F24J 2/542 |
| | | 126/605 |
| 2011/0067750 A1 | 3/2011 | Ueda |
| 2011/0114079 A1 | 5/2011 | Heckendorn |
| 2011/0308512 A1 | 12/2011 | Nakasato et al. |
| 2012/0216852 A1 | 8/2012 | Almy et al. |
| 2012/0318325 A1 | 12/2012 | Liu |
| 2014/0182577 A1 | 7/2014 | Linderman et al. |
| 2014/0230804 A1 | 8/2014 | Siddiqui et al. |
| 2017/0163208 A1* | 6/2017 | Almy ............... H02S 20/32 |

FOREIGN PATENT DOCUMENTS

| | | |
|---|---|---|
| WO | 2010/083866 A2 | 7/2010 |
| WO | 2011116449 A1 | 9/2011 |
| WO | 2013057332 A1 | 4/2013 |

OTHER PUBLICATIONS

Hanieh, Solar Photovoltaic Panels Tracking System, Proceedings of the WSEAS 6th International Conference on Dynamical Systems and Control (Control 2010). Advances in Dynamical Systems and Control, 2010, pp. 30-37, WSEAS Press.

Engin et al., Optimization mechatronic sun tracking system controller's for improving performance, 2013, pp. 1108-1112, IEEE Computer Society, Washington, DC, USA.

\* cited by examiner

OSCILLATION BRAKE FOR SOLAR TRACKING SYSTEM

FIELD

The described embodiments relate to solar-tracking photovoltaic modules. In particular, control systems for ameliorating oscillatory motion of the solar-tracking photovoltaic modules are discussed.

BACKGROUND

Photovoltaic or PV modules generate the most energy when oriented directly towards the sun. Unfortunately, the moving parts required to keep the photovoltaic modules oriented towards the sun tend to make the support structures associated with the photovoltaic modules substantially more susceptible to wind damage. This due in part to the standard geometry of a tracker system whereby a series of PV modules are mounted in a row along a rotating north-south axis known as a torque tube. Up to about 80 modules may be attached along the length of single torque tube. As the wind pushes on the PV modules, it applies torsion to the torque tube, tending to twist the torsion tube along its main axis. Therefore, the geometry of a solar tracker makes it vulnerable to, strong wind conditions. Depending on the angle of the photovoltaic modules with respect to the wind flow, some wind conditions can cause damage by inducing oscillations in the torque tube assembly via forces applied to the photovoltaic modules. Consequently, support structures well suited for operation in varying wind conditions are desirable.

SUMMARY

This disclosure describes various embodiments that relate to methods and apparatus for securing a solar-tracking support structure when strong winds blow across an array of photovoltaic modules supported by the solar-tracking support structure.

A solar-tracking photovoltaic array is disclosed. The solar-tracking photovoltaic array includes the following: a torque tube having a first end and a second end opposite the first end; photovoltaic modules coupled with and distributed along the torque tube; a locking mechanism coupled with and configured to prevent movement of a first end of the torque tube; and an orientation motor coupled with a second end of the torque tube. The locking mechanism releases the first end of the torque tube during actuation of the orientation motor.

In many embodiments, the locking mechanism includes one or more movable pins configured to engage openings defined by the torque tube.

In many embodiments, the locking mechanism also includes one or more solenoids configured to generate a magnetic field to interact with a magnet disposed within a corresponding movable pin.

In many embodiments, the photovoltaic array also includes support columns configured to support the torque tube above the ground.

In many embodiments, each of the support columns includes a bearing in direct contact with the torque tube and each bearing includes a locking mechanism.

In many embodiments, the photovoltaic array also includes a support column that supports the orientation motor substantially the same distance above the ground as the torque tube.

In many embodiments, the locking mechanism takes the form of a brake.

In many embodiments, the brake includes a disc rigidly coupled with the first end of the torque tube.

In many embodiments, the brake includes a braking mechanism coupled to a bearing supporting the first end of the torque tube, the braking mechanism being configured to compress a brake pad against the disc to oppose rotation of the first end of the torque tube.

A method for operating a solar-tracking photovoltaic array is described. The method includes carrying out the following: determining that a torque tube requires rotation to keep photovoltaic modules coupled to the torque tube oriented towards the sun; disengaging a locking mechanism from a first end of the torque tube that opposes rotation of the torque tube; rotating a second end of the torque tube using an orientation motor that rotates the torque tube in a direction that causes the photovoltaic modules to be oriented more directly towards the sun; and engaging the locking mechanism with the first end of the torque tube after the orientation rotates the torque tube.

In many embodiments, a controller directs concurrent energizing of both the locking mechanism and the orientation motor.

In many embodiments, disengaging the locking mechanism includes energizing a solenoid that withdraws a pin engaged within an opening defined by the torque tube from the opening.

In many embodiments, engaging the locking mechanism includes reversing the flow of electricity through the solenoid to re-engage the pin within the opening defined by the torque tube.

In many embodiments, the torque tube needs to be rotated includes when the sun is offset more than a predetermined angle away from the photovoltaic modules.

In many embodiments, the method also includes applying a preload to the torque bar using the orientation motor subsequent to engaging the locking mechanism.

Another solar-tracking photovoltaic array is disclosed. The photovoltaic array according to this embodiment includes the following: a torque tube; photovoltaic modules rigidly coupled to the torque tube; an orientation motor coupled with the first end of the torque tube; and a bearing supporting a portion of the torque tube, the bearing including a solenoid and a magnetic pin, the solenoid configured to transition the magnetic pin between a locked position and an unlocked position.

In many embodiments, the solenoid is energized to move the magnetic pin to the unlocked position when the orientation motor is energized to move the torque tube.

In many embodiments, the torque tube is a first torque tube portion extending from a first side of the orientation motor and the solar-tracking photovoltaic array also includes a second torque tube portion extending from a second side of the orientation motor, the second side being opposite the first side.

In many embodiments, the orientation motor is configured to rotate the first and second torque tube portions concurrently.

In many embodiments, the solar-tracking photovoltaic array includes multiple bearings distributed along the torque tube and configured to support the torque tube above the ground. Each of the bearings includes a magnetic pin and a solenoid configured to transition the magnetic pin between a locked position and an unlocked position.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Photovoltaic modules can be arranged in many different ways. For example, in some cases, arranging multiple photovoltaic modules facing in a generally upward orientation can provide long periods of time during a particular day in which the photovoltaic modules gather substantial amounts of light. When it can be anticipated which hours of the day large amounts of electricity will be consumed, the photovoltaic module can be oriented in a direction optimized for most efficient collection during those hours. However, when it is important to maximize an amount of energy collected by the photovoltaic modules, the photovoltaic modules can be positioned upon a rotating support structure with a motor configured to keep the solar panels oriented towards the sun throughout the day. Unfortunately, support structures configured to reorient the photovoltaic modules in this way are generally much more complex than a support structure designed only to secure the photovoltaic modules in a single orientation. The complexity and moving parts involved in facilitating the sun tracking can reduce the effective strength of the support structure.

One particular solar-tracking configuration that can be susceptible to wind damage is a system in which an orientation motor is configured to rotate one end of a torque tube supporting a row of solar panels. In particular, the distal end of the torque tube opposite the orientation motor can undergo substantial amounts of twist during times in which strong winds buffet the photovoltaic modules, which are supported and oriented by the torque tube. In general, the end of a longer torque tube can accommodate more twist than a shorter torque tube on account of the stress from the twisting being spread across a greater length of material. The forces applied by the wind can have multiple characteristics. The first characteristic is associated with the force imparted by the steady state wind velocity incident to the photovoltaic modules. In general, greater angles of the photovoltaic module with respect to the ground cause larger amounts of force to be imparted by the wind. This characteristic can place a large steady amount of torque on the torque tube in the direction of the prevailing wind. The second characteristic relates to dynamic forces generated by the wind that can take the form of vortex shedding. When the photovoltaic modules are angled with respect to the flow of the wind, the planar shape of the photovoltaic modules can form a wing type structure. As the wind flows past the leading and trailing edges of the photovoltaic modules, alternating low-pressure vortices are created along the surface of the photovoltaic modules facing away from the flow of wind. These low-pressure vortices can induce oscillatory motion in the photovoltaic modules that can cause fatigue and eventual failure of the torque tubes in some configurations.

One solution to this problem is to add a locking mechanism to the end of the torque tube, allowing one end of the torque tube to be constrained by the orientation motor and the other end by the locking mechanism. While a central portion of the torque tube may still be susceptible to some oscillatory motion, constraining the free end of the torque tube substantially decreases the amount of oscillation possible in the system. In locations of severe winds, multiple locking mechanisms could be arranged along the torque tube. The locking mechanisms can be configured to release any time the orientation motor rotates the torque tube. In this way, the locking mechanisms can reduce the incidence of free rotation of the torque tube with the exception of those periods of time during which the torque tube is rotated. In some embodiments, the locking mechanisms can be in a locked position by default. A safety precaution can be added in which the locking mechanism is configured to lock the torque tube in place during any incidence of power loss. This is particularly helpful in situations where the orientation motor is incapable of operation during a loss of power.

In some embodiments, after the orientation motor moves the torque tube to a new position and the locking mechanism secures the torque tube, the orientation motor can be configured to apply a preload to the torque tube to further reduce the likelihood of oscillations developing in the torque tube. Generally, the preload force can be configured to impart an amount of twist in the torque tube that increases the rigidity of the torque tube. In some embodiments, the preload could be oriented opposite the wind to further reduce the likelihood of oscillations being developed in the torque tube. It should be noted that the preload can be applied in either direction. In some embodiments, the locking position may be offset from the ideal sun angle so that when the preload is applied and imparts an amount of twist in the torque tube, an average angle of the photovoltaic modules mounted on the torque tube can be consistent with the position of the sun.

The locking mechanism itself can take many forms. In some embodiments, the locking mechanism can take the form of a magnetic, spring-loaded pin. The spring of the spring-loaded pin can be configured to bias the pin into an opening defined by the torque tube. When the orientation motor is commanded to rotate the torque tube a solenoid proximate the magnetic pin can be energized. The solenoid can be configured to generate a magnetic field that attracts the magnetic pin, thereby drawing the magnetic pin out of the opening defined by the torque tube.

Alternatively, the locking mechanism can take the form of a disc break affixed to one end of the torque tube. The disc brake can be configured to engage during times when the orientation motor is not actively rotating the torque tube. In some embodiments, the disc brake can be electrically actuated while in other embodiments the disc brake can be hydraulically or pneumatically actuated.

In some embodiments, one or more sensors could be used to gather information about wind conditions and oscillatory motion of the torque tube. Accelerometers, strain gauges, pressure gauges and inclinometers mounted to the photovoltaic array can provide indications regarding conditions being experienced by the photovoltaic modules of the photovoltaic array. For example, pressure sensors can be operative to help measure any prevailing wind shear effects by characterizing the wind speed In some embodiments, the locking mechanisms can be configured to remain disengaged until sensors of the photovoltaic array indicate prevalent winds may cause damage to the photovoltaic array.

It should be appreciated that, in some embodiments, two or more of the aforementioned sensors could be used to provide more accurate or redundant data. For example, while a single inclinometer might provide better angular readings at one portion of the torque tube, a series of strain gauges could help characterize twist across the length of the torque tube. The inclinometer data could then be used to refine information collected by the strain sensor data, particularly when a strain gauge is positioned near the inclinometer. The sensor data could then be used to determine a magnitude of the preload applied to the torque tube. For example, higher or more dangerous wind conditions could justify the use of greater preloading forces. Similarly, in light or negligible wind conditions, the orientation motor could apply minimal forces or completely refrain from applying preload forces to the torque tube.

These and other embodiments are discussed below with reference to FIGS. 1A-6, however, those skilled in the art will readily appreciate that the detailed description given herein with respect to these figures is for explanatory purposes only and should not be construed as limiting.

Figure 1A:
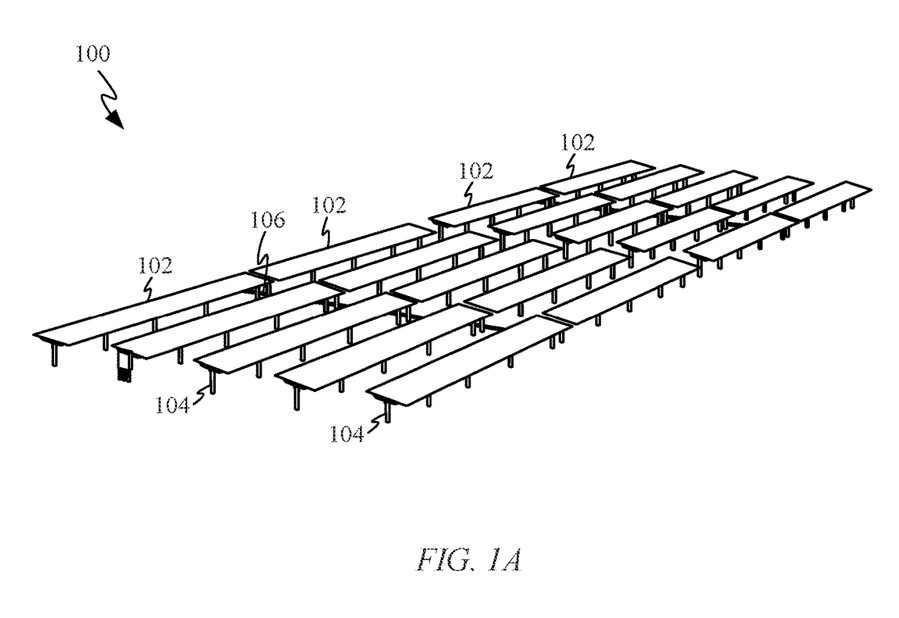
FIG. 1A shows an exemplary solar-tracking photovoltaic array.

FIG. 1A shows photovoltaic array 100 supporting multiple photovoltaic modules 102. As depicted, photovoltaic modules 102 are supported above the ground by multiple support structures that include support columns 104. The support structures can each include components for keeping photovoltaic modules 102 oriented towards the sun. Because adjacent rows of photovoltaic modules 102 interrupt any flow of wind passing through photovoltaic modules 102, each row of modules can experience substantially different forces from the flow of any wind passing through photovoltaic array 100. FIG. 1A also depicts electrical power lines 106 supplying power to motors configured to keep photovoltaic modules 102 oriented towards the sun. In general, the arrays of photovoltaic modules are arranged in rows oriented in a North/South direction, so that the photovoltaic modules can track the suns progress from East to West by rotating photovoltaic modules 102 about a single axis of rotation.

Figure 1B:
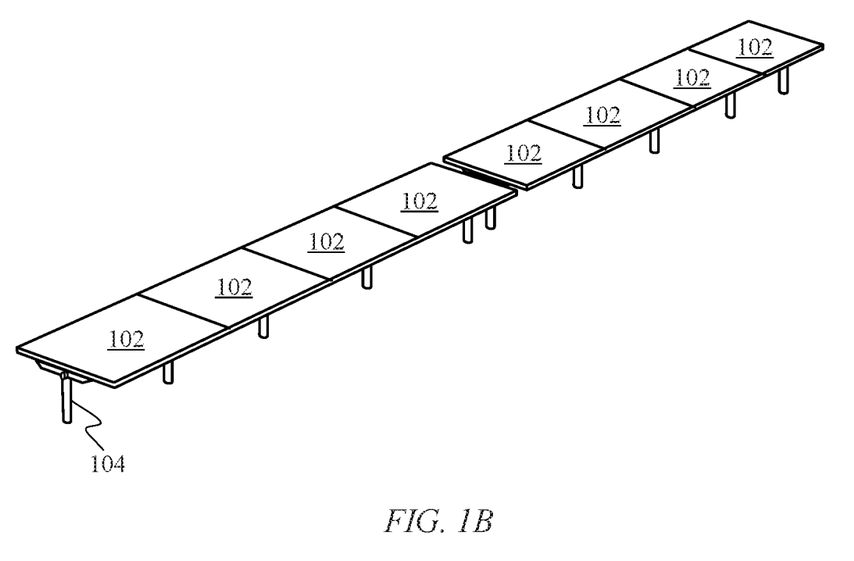
FIG. 1B shows a number of photovoltaic modules mounted on a support structure.

FIG. 1B shows a number of photovoltaic modules 102 mounted on a support structure. In particular, half of the photovoltaic modules are distributed along a first side of the support structure and the other half of the photovoltaic modules are distributed along a second side of the support structure. The first and second sides of the support structure can each take the form of a torque tube supported above the ground by multiple support columns 104. Support columns 104 can be configured to support a corresponding torque tube above the ground without restraining rotation of the torque tube. In some embodiments, the columns can include a bearing that allows the torque tubes free rotation of the torque tubes. A motor can be positioned in the center of the support structure and coupled to one end of each torque tube. In this way, a single motor can be configured to control rotation of each end. In some embodiments, the motor can be configured to apply different forces to each torque tube. In other embodiments, the motor can be configured to rotate the torque tubes in the same or similar manners. In still other embodiments, a single torque tube can extend through the motor and act to rotate photovoltaic modules on both sides of the motor. It should be noted that in some embodiments, the photovoltaic array can be configured with multiple motors and configured to rotate about multiple axes. The control methodologies described herein can be implemented in similar manners for a system having two or more motors.

Figure 2A:
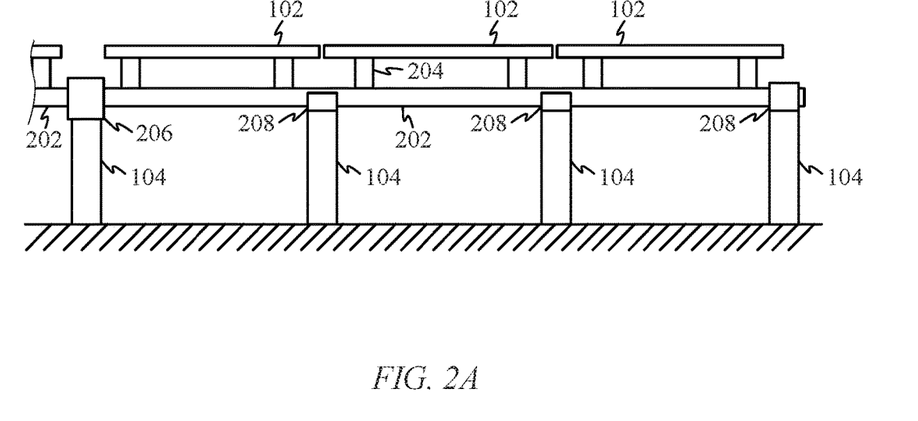
FIG. 2A shows a side view of one side of the support structure configured to support and orient photovoltaic modules.

FIG. 2A shows a side view of one side of a support structure configured to support and orient photovoltaic modules 102. FIG. 2A shows how photovoltaic modules 102 are supported above torque tube 202 by module mounts 204. In some embodiments, photovoltaic modules 102 can be separated by small gaps. In other embodiments, a unitary photovoltaic module can stretch across one side of the support structure and be supported by each of module mounts 204. In some embodiments, photovoltaic modules 102 can be in direct contact with adjacent photovoltaic modules, or in direct contact with mounting hardware of adjacent photovoltaic modules. When photovoltaic modules 102 are arranged without gaps, turbulence caused by wind passing between photovoltaic modules 102 can be avoided. FIG. 2A also depicts orientation motor 206, which is mechanically coupled with one end of torque tube 202 and configured to rotate torque tube 202 in a manner that keeps photovoltaic modules 102 oriented towards the sun. FIG. 2A also depicts bearings 208, which are distributed along a length of torque tube 202. Each bearing and associated support column 104 helps to support the weight of a portion of torque tube 202 and photovoltaic modules 102 without preventing torque tube 202 from rotating to achieve desirable orientations of photovoltaic modules 102 for collecting sunlight. Bearings 208 can take the form of a closed circular bearing that constrains deflection of a portion of torque tube 202 in any direction or an open bearing functioning primarily to support a portion of torque tube 202 above the ground.

Figure 2B:
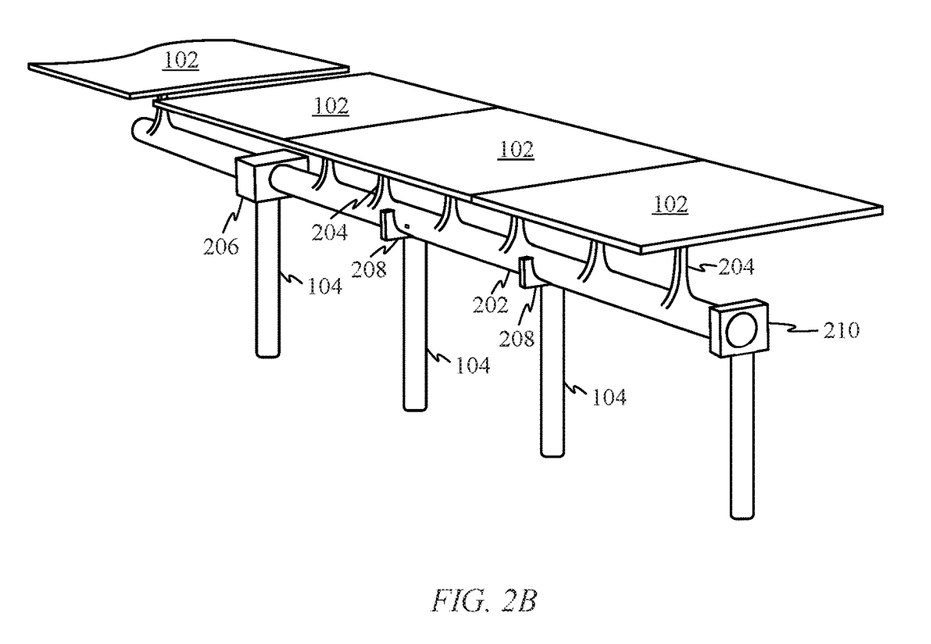
FIG. 2B depicts a perspective view of photovoltaic modules mounted atop the support structure.

FIG. 2B depicts a perspective view of photovoltaic modules mounted atop the support structure. During normal operations of photovoltaic array 100, orientation motor 206 is utilized for orienting photovoltaic modules 102 towards the sun. Tracking the sun can be accomplished by rotating torque tube 202 in small increments. The increments can be determined by referencing a lookup table giving sun position data throughout the day for a known latitude. Alternatively, a sensor mounted on or near the photovoltaic modules can be configured to determine a direction in which the photovoltaic modules should be pointed. Rotation of torque tube 202 is particularly effective when torque tubes 202 are oriented in a North-South direction, thereby allowing incremental rotation of torque tube 202 to cause photovoltaic modules 102 to track the sun from East to West throughout the course of a day. In some embodiments, when sensors mounted to the support structure and/or the photovoltaic modules detect uncommanded movement of the torque tube, locking mechanism 210 can be configured to engage and prevent movement of one end of torque tube 202 whenever orientation motor 206 is not being used to rotate torque tube 202. When orientation motor 206 can constrain the portion of torque tube 202 to which orientation motor 206 is coupled, orientation motor 206 and locking mechanism 210 can cooperate to effectively constrain both ends of torque tube 202. In some embodiments, locking mechanism 210 is configured to prevent rotation of torque tube 202 any time orientation motor 206 is not actively turning torque tube 202.

Figure 3A:
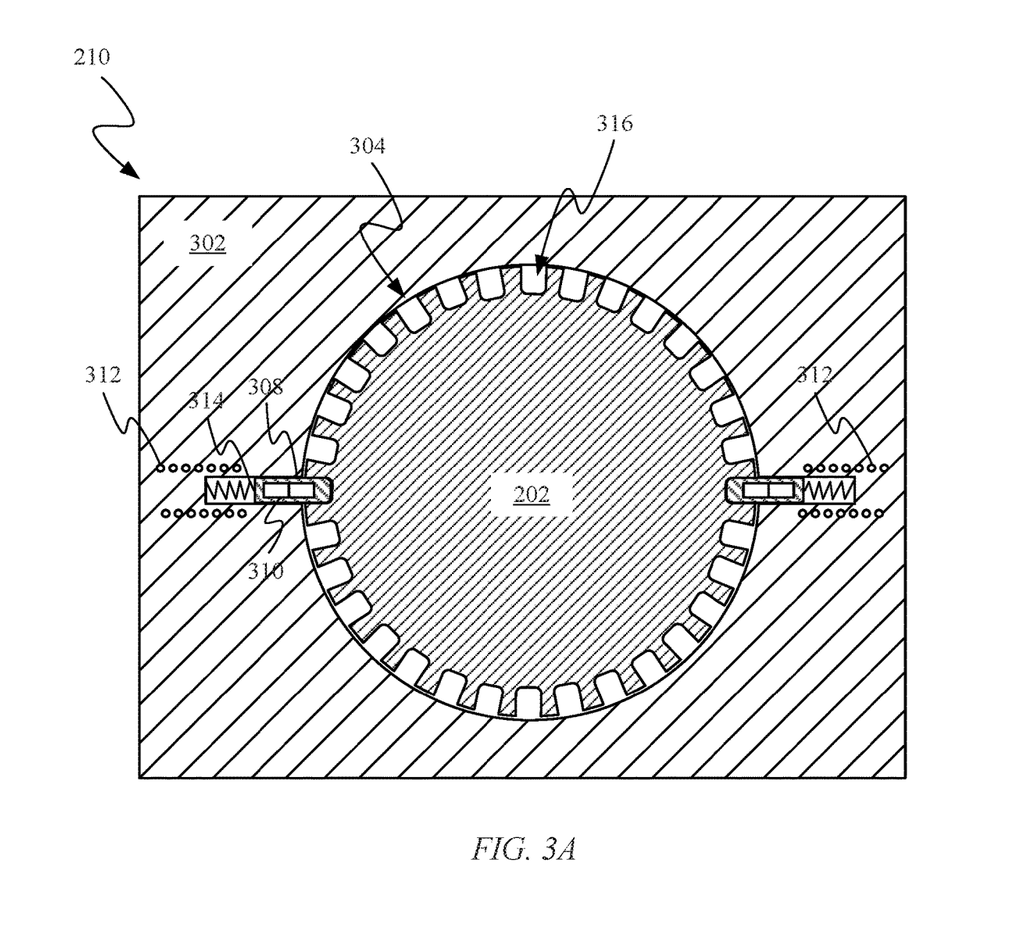
FIG. 3A shows a cross-sectional view of an exemplary configuration for a locking mechanism in a locked state.
Figure 3B:
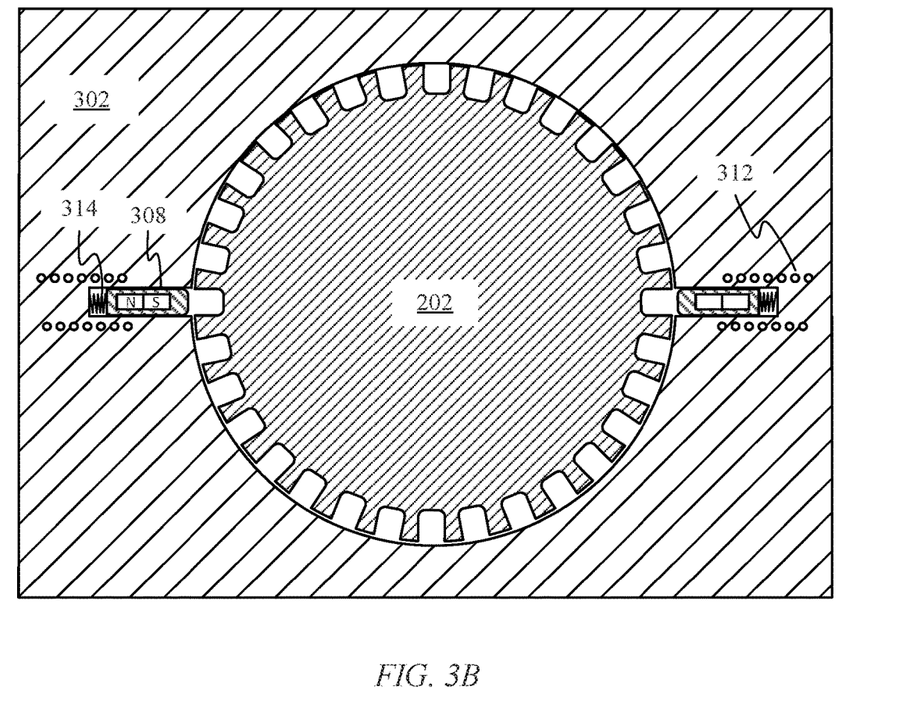
FIG. 3B shows a cross-sectional view of an exemplary configuration for a locking mechanism in an unlocked state.

FIG. 3A shows a cross-sectional view of an exemplary configuration for locking mechanism 210. FIG. 3A shows locking mechanism in a locked state. Locking mechanism 210 includes a housing 302 defining an opening 304 for accommodating a portion of torque tube 202. Housing 302 also defines multiple channels 306 within which spring-loaded pins 308 can be positioned. Each of spring-loaded pins 308 can include a magnet 310. Poles of magnet 310 can be oriented so that a magnetic field generated by a corresponding one of solenoids 312 generates a magnetic field of sufficient strength to compress spring 314 of spring-loaded pins 308 as shown in FIG. 3B. When spring 314 is compressed, spring-loaded pins 308 can be completely drawn out of openings 316 defined by torque tube 202. Openings 314 can be spaced at an interval that corresponds to each position assumed by torque tube during a day. In this way, spring-loaded pin 308 can be locked into position in all sun-collecting positions. Once spring-loaded pins 308 are removed from openings 316, orientation motor 206 can be free to rotate torque tube 202, until solenoids 312 are de-energized and spring-loaded pins 308 re-engage one of openings 316. In some embodiments, a flow of current through solenoids 312 can be reversed to push spring-loaded pins 308 away from solenoids 312 prior to being de-energized. This step can help push spring-loaded pins 308 back into corresponding openings 316 to secure torque tube 202 into the new angular position. It should be noted that while two spring-loaded pins 308 are depicted that many more pins or as few as one pin can be used to accomplish the same purpose and function. Furthermore, in addition to being located at a distal end of torque tube 202, locking mechanisms could be integrated within any one or more of the other bearings 208 of photovoltaic array 100.

In this type of locking mechanism configuration, electricity can be supplied to both orientation motor 206 and solenoids 312 at the same time. By setting the system up so that orientation motor 206 only receives electricity while rotating torque tube 202, anytime orientation motor 206 is not rotating torque tube 202, solenoids 312 become de-energized and lock torque tube 202 firmly in place with the released spring-loaded pins 308. This can be quite beneficial for a number of reasons. Primarily, it secures the otherwise unconstrained end of torque tube 202, thereby resisting undesired rotation of that end caused by wind buffeting photovoltaic modules 102. This configuration also can prevent the inadvertent free movement of torque tube 202 during a power outage. In some embodiments, photovoltaic array 100 can include a backup battery with sufficient energy to power orientation motor 206 and solenoids 312 long enough for torque tube 202 to return photovoltaic modules 102 to an upward facing orientation in which wind is less likely to buffet or damage photovoltaic modules 102.

Figure 4A:
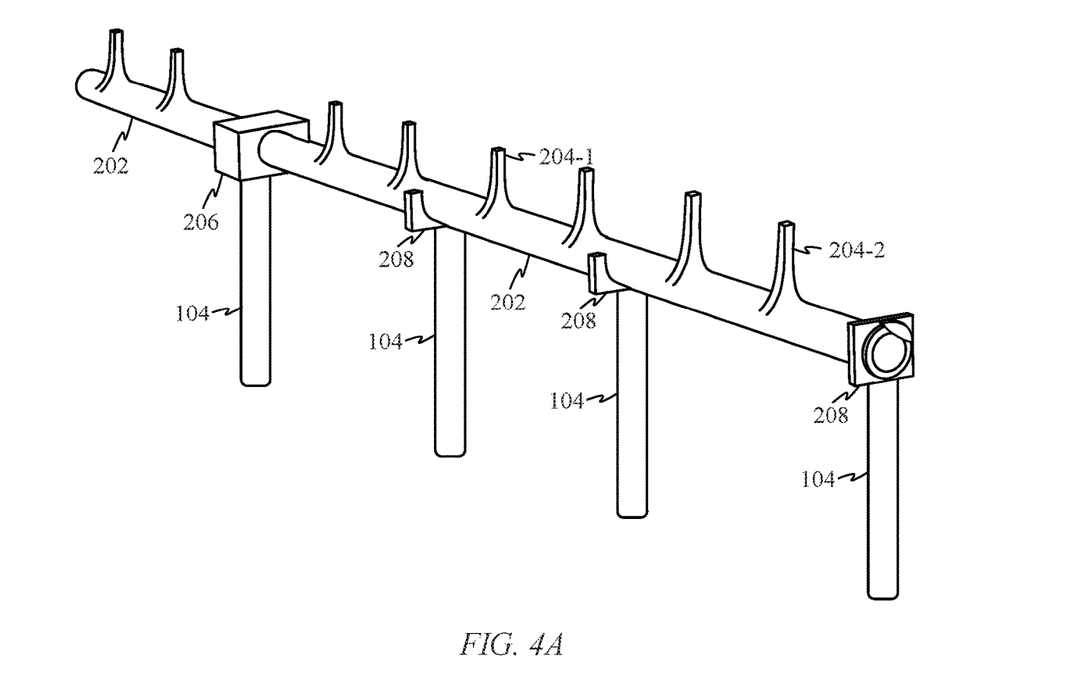
FIG. 4A shows a representation of a locking mechanism attached to a torque tube with photovoltaic modules removed.
Figure 4B:
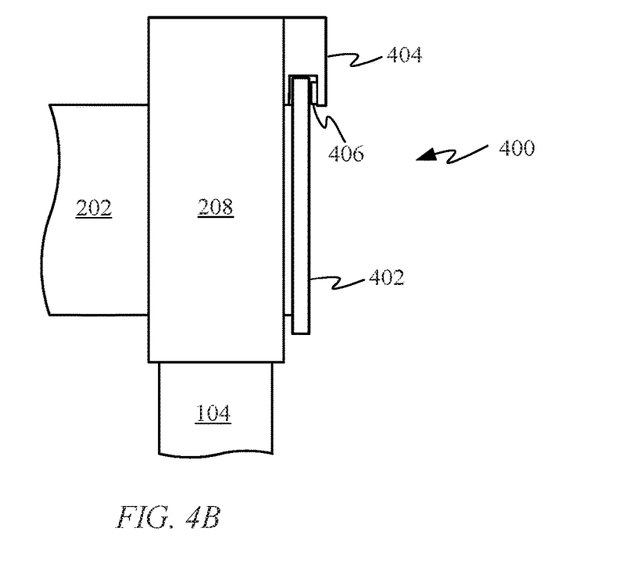
FIG. 4B shows a disc break mounted on the torque tube.

FIG. 4A shows a representation of torque tube 202 with photovoltaic modules 102 removed. Allowing one end of torque tube 202 to rotate freely can result in negative outcomes. This can be particularly true when wind buffets the attached photovoltaic modules and causes oscillation of that free end. Such a situation could cause each of support mounts 204 to undergo slightly different amounts of angular movement. This then can result in shearing forces being applied to photovoltaic modules 102 by support mounts 204. These shearing forces are undesirable and can be particularly harmful when multiple photovoltaic modules are rigidly coupled together. It should be noted that in addition to orientation motor 206, the photovoltaic array can include disc brake 400, mounted to bearing 208 and depicted in FIG. 4B. Disc brake 400 can include disc 402 rigidly coupled to the free end of torque tube 202. Disc 402 can be formed from any number of materials, including for example, cast iron, reinforced carbon-carbon or ceramic matrix composites. Disc brake 400 can also include brake mechanism 404, which can be secured to a surface of bearing 208. Brake mechanism 404 can include brake pad 406, which gets compressed against disc 402 by brake mechanism 404 to slow down and oppose movement of disc 402 and torque tube 202. In some embodiments, brake mechanism 404 can be electrically powered and only allow disc 402 to rotate when receiving electrical power. When not receiving electrical power, brake mechanism 404 can remain firmly clamped to disc 402, which prevents movement of torque tube 202. Brake mechanism 404 can also be powered in other ways, including hydraulically. Similarly, the hydraulic system could be setup so that the hydraulics only open brake mechanism 404 to allow free rotation of torque tube 202 when orientation motor 206 is actively rotating torque tube 202.

Figure 4C:
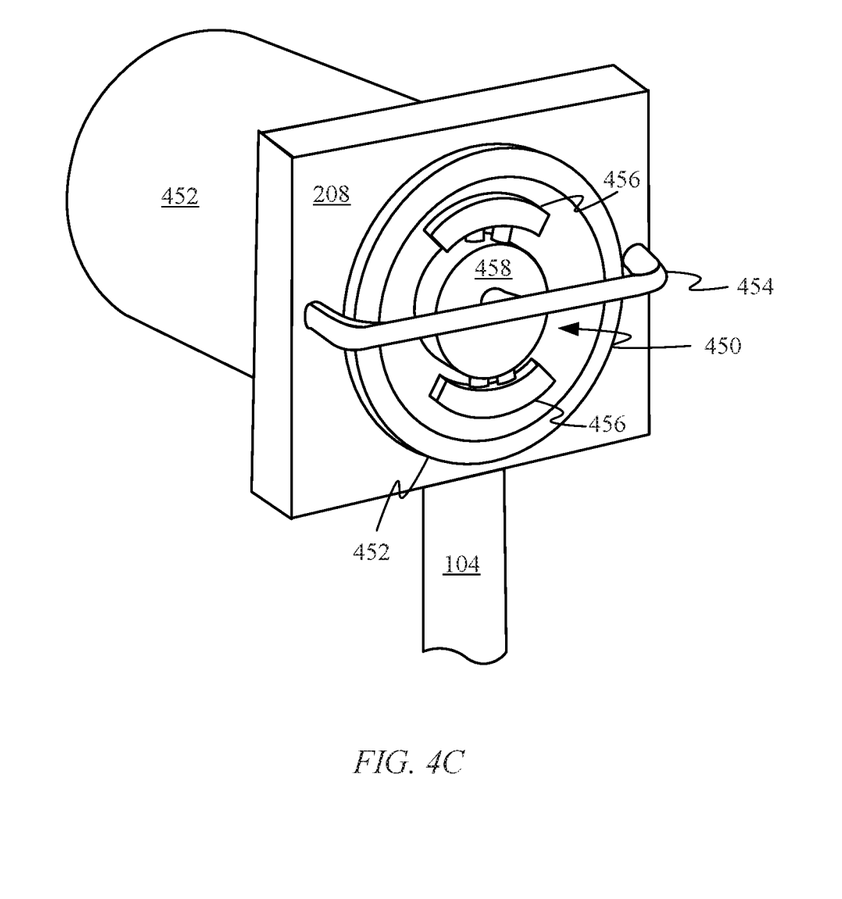
FIGS. 4C-4D show an alternative brake mechanism for opposing rotation of an at least partially hollow torque tube.
Figure 4D:
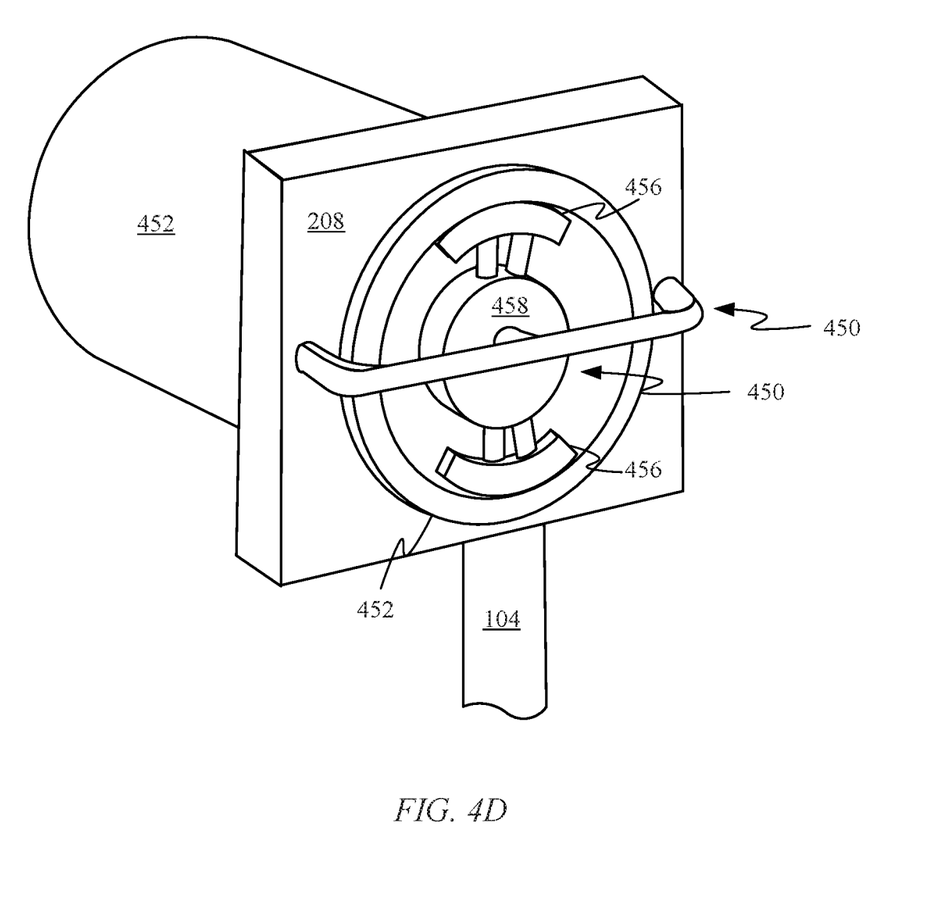

FIGS. 4C-4D show alternative brake mechanism 450 for opposing rotation of hollow torque tube 452. FIG. 4C shows how brake mechanism 450 positioned within a hollow end of hollow torque tube 452. Brake mechanism 450 can be suspended within hollow torque tube 452 by support structure 454. Support structure 454 can take many forms but as depicted extends across the end of hollow torque tube 452 and includes a column that positions brake mechanism 450 within the hollow end. Support structure 454 is depicted being joined to bearing 208, but could also be attached to other adjacent structures, such as for example, support column 104. Brake mechanism 450 can include one or more brake pads 456. By arranging brake pads 456 symmetrically a force exerted upon an interior surface of hollow torque tube 452 can be evenly balanced, thereby avoiding asymmetric loading on support structure 454. Brake pads 456 can include actuation members that join brake pads 456 to a body 458 of brake mechanism 450. The actuation members can be actuated in any number of ways, including electrical or hydraulic actuation. FIG. 4D shows how the actuation members can extend from body 458 to exert a force with brake pads 456 upon the interior surface o hollow torque tube 452. In some embodiments, an entire length of torque tube 202 can be hollow. In such an embodiment, a thickness of the walls defining the hollow within torque tube 202 can be sized to achieve a desired stiffness of torque tube 202. Furthermore, in some embodiments an interior surface of torque tube 202 can include a friction layer composed of a material configured to enhance friction between brake pad 456 and the friction layer.

Figure 5A:
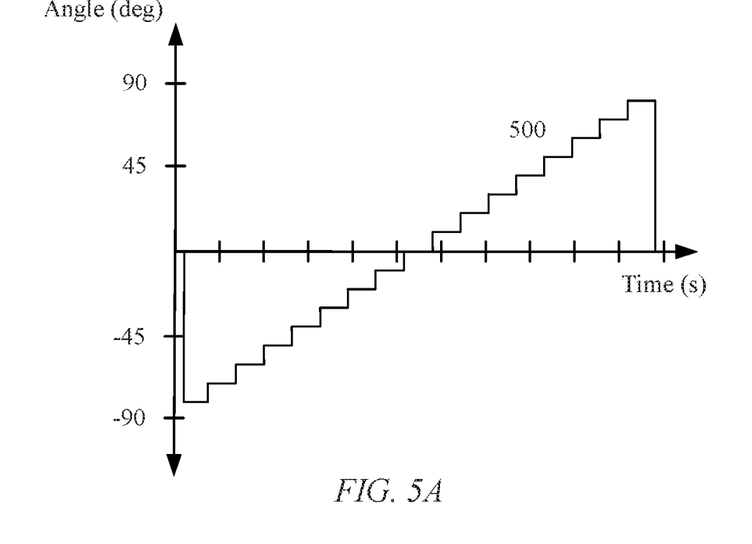
FIG. 5A shows a graph including a profile representing an angular position of a torque tube over the period of a day.

FIG. 5A shows a graph including a profile 500 representing an angular position of a torque tube over the period of a day. The left side of the graph represents sunrise and the right side represents sunset An angle of zero degrees represents the photovoltaic modules being oriented directly upwards. An angle of about 80-degrees represents an angle optimized for collecting sunlight during sunrise and an angle of about 80-degrees represents an angle optimized for collecting sunlight during sunset. It should be noted these angles can vary based upon how close the photovoltaic modules are packed. As depicted, an orientation of the photovoltaic modules can be set by the orientation motor to an angle of zero degrees to reduce any surface level winds from buffeting the photovoltaic modules during evening hours. FIG. 5A shows how during daylight hours the orientation motor can step from one angle to another to keep the photovoltaic modules pointed towards the current position of the sun in the sky. Step sizes can be larger and less frequent or smaller and more frequent. In some embodiments, the orientation motor can be configured to rotate the torque tube continuously to achieve even higher accuracy tracking.

Figure 5B:
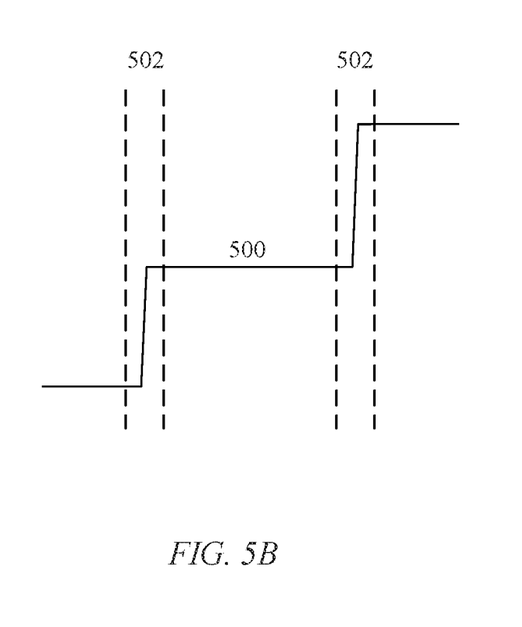
FIG. 5B shows a close up view of a portion of the profile indicating time periods during which torque tubes transition photovoltaic modules from one angular position to another.

FIG. 5B shows a close up view of a portion of profile 500 indicating time periods 502 during which torque tubes transition photovoltaic modules from one angular position to another. In embodiments utilizing an orientation motor and solenoids for locking the torque tube, both the solenoids and orientation motor can be energized just prior to rotation of the torque tube. Once the orientation motor has moved the torque tube to the new angular position, power delivery to the orientation motor can stop, thereby locking the torque tube in place until the orientation motor is ready to rotate the torque tube again. In some embodiments, an inclinometer can be used to verify the torque tube has reached the proper angle prior to de-energizing the photovoltaic array. In some embodiments, openings defined by the torque tube can interact with spring-loaded pins associated with the solenoids to refine the angular position of the torque tube. In some embodiments, spring-loaded pins associated with the solenoids can have chamfered features for aligning the spring-loaded pins with openings defined by the torque tube. Interaction between the chamfered features of the spring-loaded pins and entrance openings to the openings of the torque tube can result in self-alignment. In some embodiments, a magnetic field sensor can be positioned proximate to the spring-loaded pins. By measuring a magnetic field emitted by the spring-loaded pin, a determination can be made of whether or not the spring-loaded pins have been fully engaged within openings defined by the torque tube.

Figure 6:
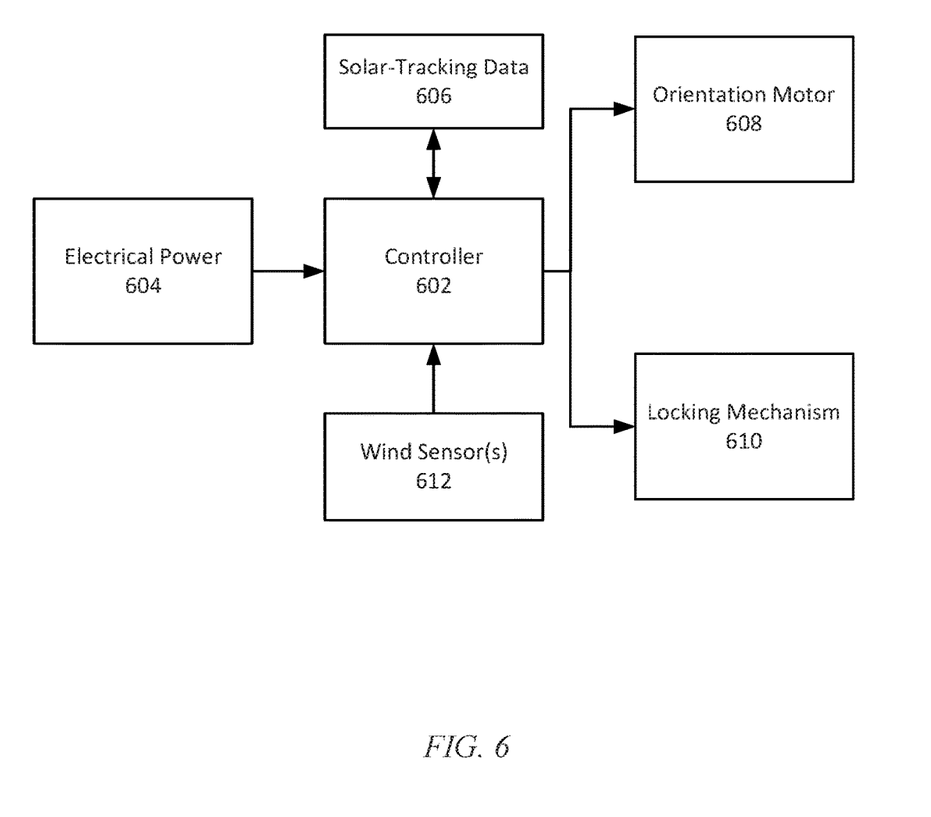
FIG. 6 shows a block diagram depicting a control scheme for the photovoltaic array.

FIG. 6 shows a block diagram depicting a control scheme for photovoltaic array 100. Controller 602 is shown and includes at least the following inputs: electrical power 604 and solar-tracking data 606. Since controller 602 is in receipt of power from electrical power 604, controller 602 can be responsible for distributing that power to other components of photovoltaic array 100. In particular, controller 602 can allow energy from electrical power 604 to energize orientation motor 608 and locking mechanism 610 during those times when solar-tracking data 606 indicates photovoltaic modules need reorienting. When energizing orientation motor 608, controller 602 can also instruct orientation motor how far to rotate an associated torque tube to achieve a desired orientation of photovoltaic modules with respect to the sun. In some embodiments, energizing locking mechanism 610 is sufficient to release the torque tube from locking mechanism 610. For example, energizing the solenoids can disengage the pins of locking mechanism 610 from the torque tube, allowing orientation motor 608 to rotate the torque tube without resistance. In addition to preventing unwanted rotation of the torque tube, locking mechanism 610 can also function to relieve some stress from orientation motor 608 as the torque generated by the tilted photovoltaic modules can be shared by locking mechanism 610. In some embodiments, locking mechanism 610 can include multiple pins distributed across multiple bearings.

In some embodiments, after removing power from locking mechanism 610 and orientation motor 608, power can be reapplied to orientation motor 608 so that orientation motor 608 can apply a preload to a portion of the torque tube to which it is coupled. This preloading increases the stiffness of the torque tube and reduces the likelihood of the torque tube undergoing unexpected twisting during adverse wind conditions. The amount of preloading applied to the torque tube can be adjusted based upon a severity of the wind conditions reported to controller 602 by wind sensor(s) 612. For example, a larger preload can be applied to the torque tube when wind sensor(s) 612 indicate wind exceeding a particular velocity. Preload magnitudes can also be based upon any oscillations that are being experienced by the torque tube. For example, a twist sensor can be configured to sense any twist being experienced by the torque tube. In some embodiments, the preload force can be increased until oscillations stop or until structural limitations of the system or orientation motor 608 don't allow for further amounts of preloading to be applied.

Sun tracking data can take many forms including but not limited to predicted sun position data and a clock. Predicted sun position data can take the form of vectors from the location of photovoltaic array 100 to the predicted position of the sun for various times during the day. Periodically, solar-tracking data 606 can be sent to controller 602 by determining the current time of day and sending the vector associated with the current time of day to controller 602. Based upon this information controller 602 can command orientation motor 608

The various aspects, embodiments, implementations or features of the described embodiments can be used separately or in any combination.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A solar-tracking photovoltaic array, comprising:
   a torque tube having a first end and a second end opposite the first end;
   a plurality of photovoltaic modules coupled with and distributed along the torque tube;
   a locking mechanism coupled with and configured to prevent movement of the first end of the torque tube; and
   an orientation motor coupled with the second end of the torque tube,
   wherein the locking mechanism releases the first end of the torque tube during actuation of the orientation motor.

2. The solar-tracking photovoltaic array of claim 1, wherein the locking mechanism comprises one or more movable pins configured to oppose rotation of the torque tube.

3. The solar-tracking photovoltaic array of claim 2, wherein the locking mechanism further comprises one or more solenoids configured to generate a magnetic field to interact with one or more magnets disposed within the one or more movable pins.

4. The solar-tracking photovoltaic array of claim 2, further comprising a plurality of support columns configured to support the torque tube above the ground.

5. The solar-tracking photovoltaic array of claim 4, wherein each of the support columns comprises a bearing in direct contact with the torque tube and each bearing comprises a locking mechanism.

6. The solar-tracking photovoltaic array of claim 4, further comprising a support column that supports the orientation motor substantially the same distance above the ground as the torque tube.

7. The solar-tracking photovoltaic array of claim 1, wherein the locking mechanism comprises a brake.

8. The solar-tracking photovoltaic array of claim 7, wherein the brake comprises a disc rigidly coupled with the first end of the torque tube.

9. The solar-tracking photovoltaic array of claim 8, wherein the brake comprises a braking mechanism coupled to a bearing supporting the first end of the torque tube, the braking mechanism being configured to compress a brake pad against the disc to oppose rotation of the first end of the torque tube.

\* \* \* \* \*